(12) United States Patent
Chao et al.

(10) Patent No.: US 7,356,888 B2
(45) Date of Patent: Apr. 15, 2008

(54) MULTI-FUNCTIONAL RETAINING STRAP

(76) Inventors: Kuo-Chih Chao, 235 Chung-Ho Box 8-24, Taipei (TW); Chia-Pin Chen, 235 Chung-Ho Box 8-24, Taipei (TW)

(*) Notice: Subject to any disclaimer, the term of this patent is extended or adjusted under 35 U.S.C. 154(b) by 241 days.

(21) Appl. No.: 11/195,551

(22) Filed: Aug. 3, 2005

(65) Prior Publication Data
US 2007/0029357 A1 Feb. 8, 2007

(51) Int. Cl.
*A44B 18/00* (2006.01)
(52) U.S. Cl. .......................... 24/442; 24/306
(58) Field of Classification Search ............ None
See application file for complete search history.

(56) References Cited
U.S. PATENT DOCUMENTS

| | | | | |
|---|---|---|---|---|
| 3,474,781 A * | 10/1969 | Gaylord, Jr. | ............. | 128/876 |
| 4,120,437 A * | 10/1978 | Hara | ............. | 280/814 |
| 4,220,302 A * | 9/1980 | Hampton et al. | ............. | 248/102 |
| 4,759,963 A * | 7/1988 | Uso et al. | ............. | 428/100 |
| 4,856,149 A * | 8/1989 | Brame | ............. | 24/3.2 |
| 4,862,563 A * | 9/1989 | Flynn | ............. | 24/442 |
| 4,893,381 A * | 1/1990 | Frankel | ............. | 24/16 R |
| 5,136,759 A * | 8/1992 | Armour, II | ............. | 24/442 |
| 5,142,743 A * | 9/1992 | Hahn | ............. | 24/16 R |
| 5,154,506 A * | 10/1992 | Leard | ............. | 362/103 |
| 5,174,483 A * | 12/1992 | Moore et al. | ............. | 224/250 |
| 5,214,874 A * | 6/1993 | Faulkner | ............. | 43/25.2 |
| 5,289,619 A * | 3/1994 | Pileggi | ............. | 24/306 |
| 5,433,359 A * | 7/1995 | Flowers | ............. | 224/222 |
| 6,049,953 A * | 4/2000 | McCay et al. | ............. | 24/302 |
| 6,076,789 A * | 6/2000 | Jackson | ............. | 248/205.2 |
| 6,896,458 B1 * | 5/2005 | Romero | ............. | 410/97 |
| 2005/0273987 A1 * | 12/2005 | Honchel | ............. | 24/442 |

* cited by examiner

*Primary Examiner*—Jack W. Lavinder

(57) ABSTRACT

A multi-functional retaining strap has two strap surfaces. Each strap surface is installed with attachable tapes. The multi-functional retaining strap comprises a short extending retaining strap having one end fixed to a middle section of the strap surface of the multi-functional retaining strap and another end which is not fixed; a surface of the short extending retaining strap being an attachable tape; an inner folded strap attached to one of the strap surfaces; at least one surface of the inner folded strap being an attachable tape; and an outer folded strap having two ends the inner folded strap; a gap being formed between the inner folded strap and the outer folded strap; at least one surface of the outer folded strap is an attachable tape; an auxiliary strap for prolonging the length of the short extending retaining strap.

3 Claims, 14 Drawing Sheets

MULTI-FUNCTIONAL RETAINING STRAP

FIELD OF THE INVENTION

The present invention relates to retaining straps, and in particular to a multi-functional retaining strap, wherein the multi-functional retaining strap has many applications such as used as a retainer, a pad or a forehead ring.

BACKGROUND OF THE INVENTION

In daily life, straps are widely used in many fields, such as wrist protecting rings, forehead rings, trouser retaining ring, etc. However in the prior art, these objects are made independently. Users must buy a variety of products for achieve different objectives. Thus the fees necessary is high and moreover, they are stored and managed individually so that much time and works are needed. This induce inconveniences to users.

SUMMARY OF THE INVENTION

Accordingly, the primary object of the present invention is to provide a multi-functional retaining strap, wherein the multi-functional retaining strap has many application such as used as a retainer, a pad or a forehead ring.

To achieve above object, the present invention provides a multi-functional retaining strap. The multi-functional retaining strap has two strap surfaces; each strap surface being installed with attachable tapes. The multi-functional retaining strap comprises a short extending retaining strap having one end fixed to a middle section of the strap surface of the multi-functional retaining strap and another end which is not fixed; a surface of the short extending retaining strap being an attachable tape; an inner folded strap attached to one of the strap surfaces; at least one surface of the inner folded strap being an attachable tape; an outer folded strap having two ends the inner folded strap; a gap being formed between the inner folded strap and the outer folded strap; at least one surface of the outer folded strap is an attachable tape; an auxiliary strap; one surface of the auxiliary strap being formed with an attachable tape; one end of the auxiliary strap is fixed to the short extending retaining strap so as to prolong the length of the short extending retaining strap. The attachable tapes are one of loop tapes, hook tapes, fasteners with loops and fasteners with hooks.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
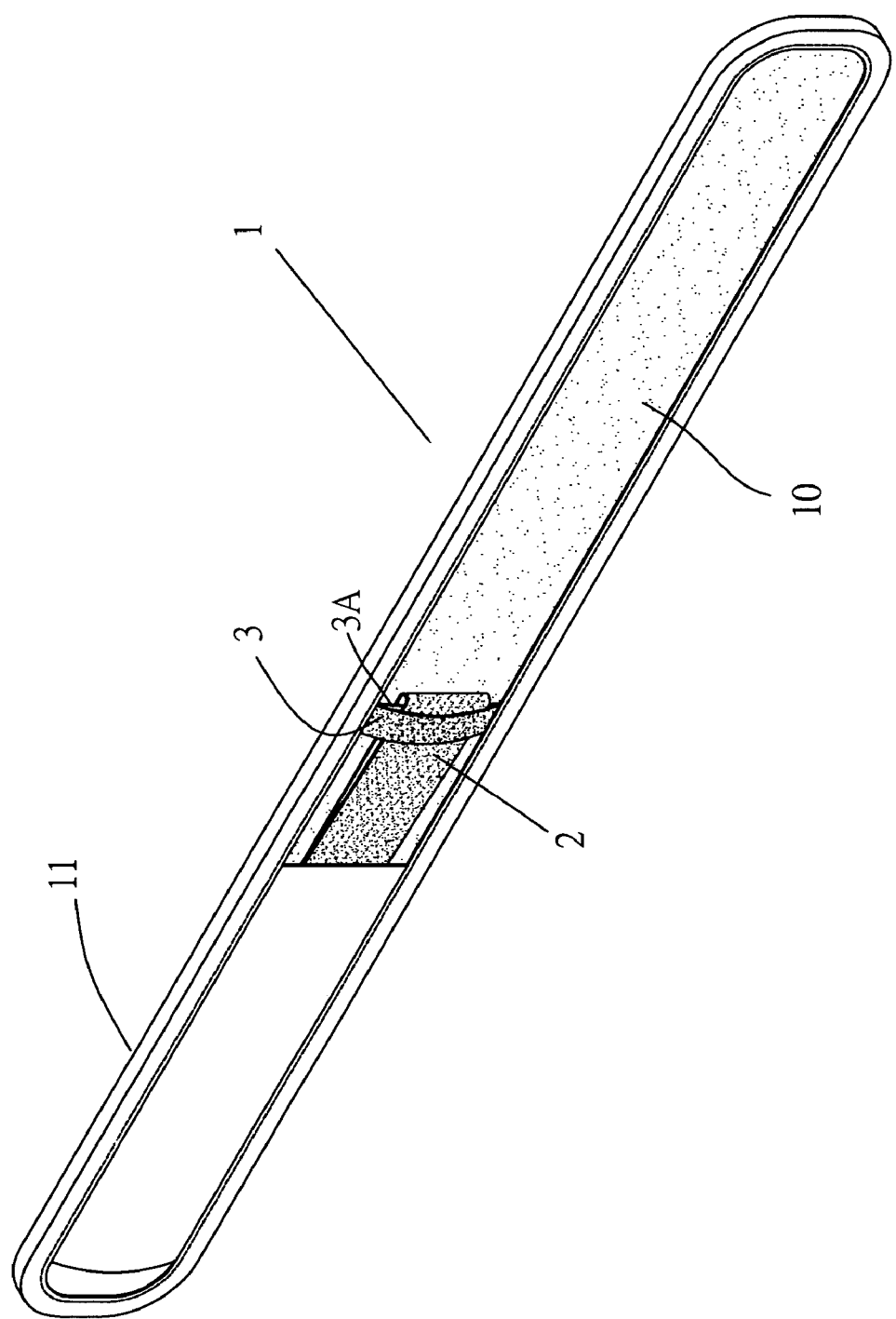
FIG. 1 shows a perspective view of one preferred embodiment of the present invention.
Figure 2:
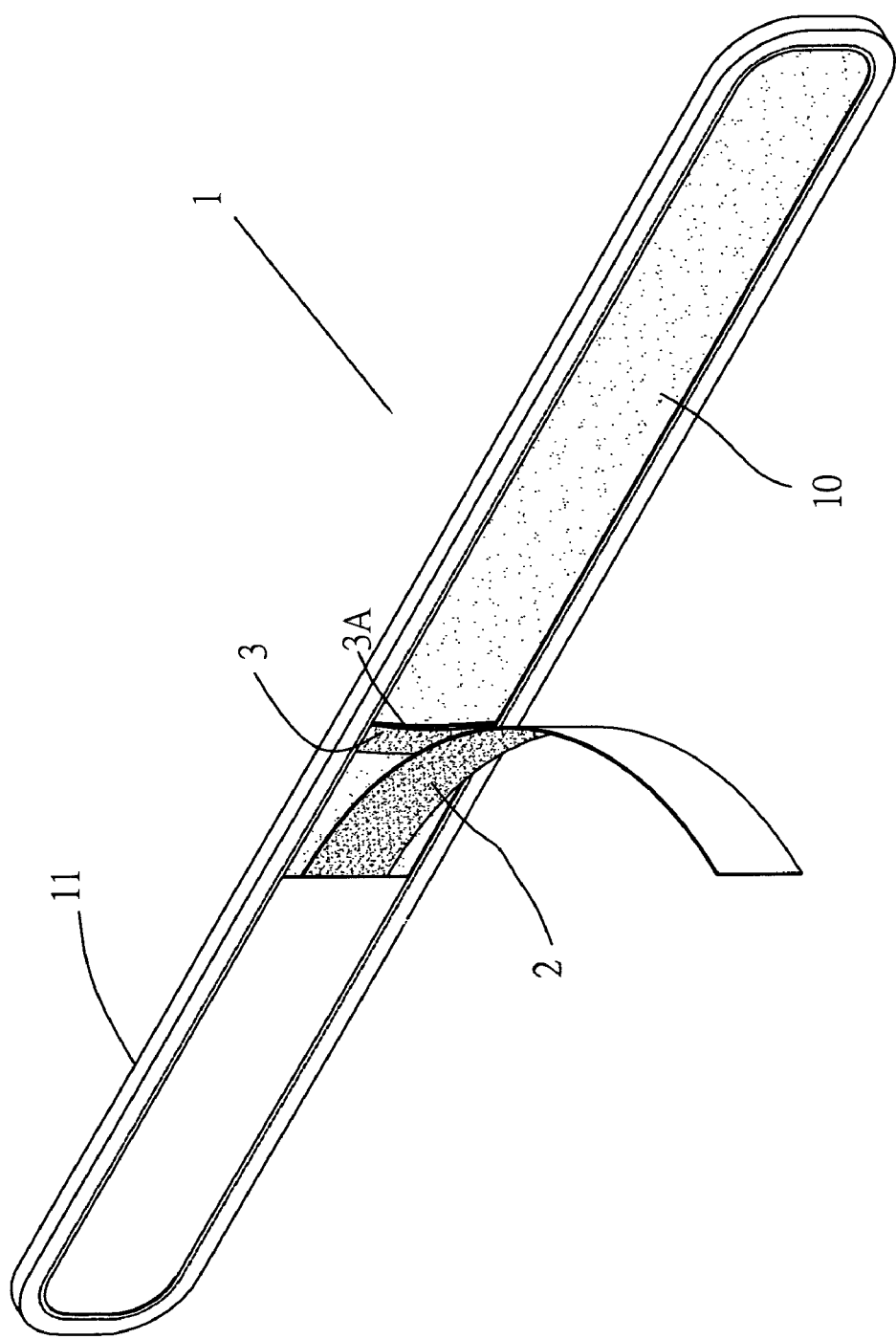
FIG. 2 shows another perspective view of the preferred embodiment of the present invention.

Referring to FIGS. 1 and 2, the perspective view of the present invention is illustrated. The multi-functional retaining strap 1 of the present invention is a belt. The multi-functional retaining strap 1 has two strap surfaces 10, 11. Each strap surface is installed with attachable tapes, such as loop tapes or hook tapes, or fasteners with loops or fasteners with hooks.

A short extending retaining strap 2 has one end fixed to a middle section of the strap surface 10 of the multi-functional retaining strap 1 and another end which is not fixed. A surface of the short extending retaining strap 2 is an attachable tape.

An inner folded strap 3A is attached to the strap surface 10. At least one surface of the inner folded strap 3A is an attachable tape.

An outer folded strap 3 has two ends fixed to the inner folded strap 3A. A gap is formed between the inner folded strap 2 and the outer folded strap 3. At least one surface of the outer folded strap 3 is an attachable tape.

Figure 3A:
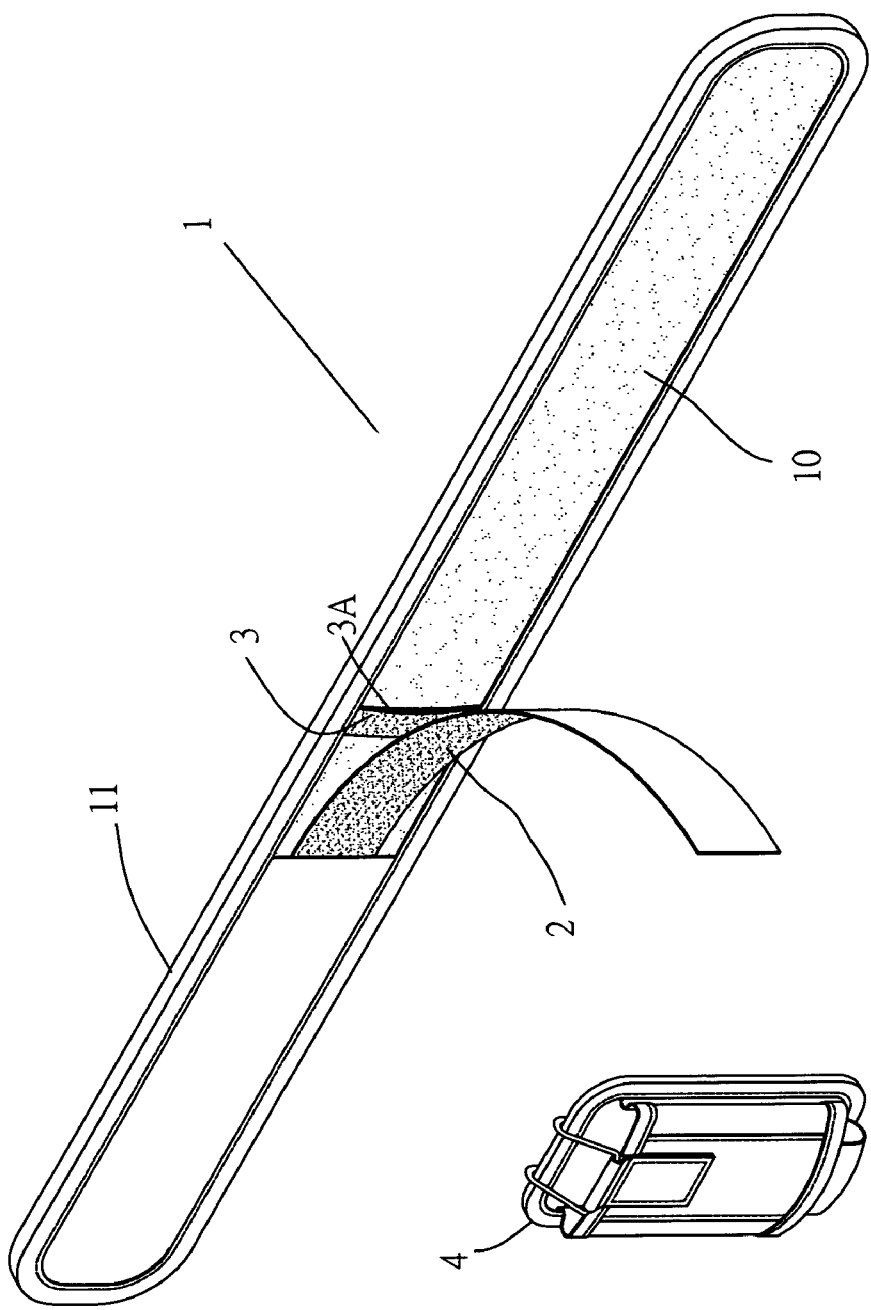
FIG. 3A shows that the present invention is used as an MP3 protecting cover.
Figure 3B:
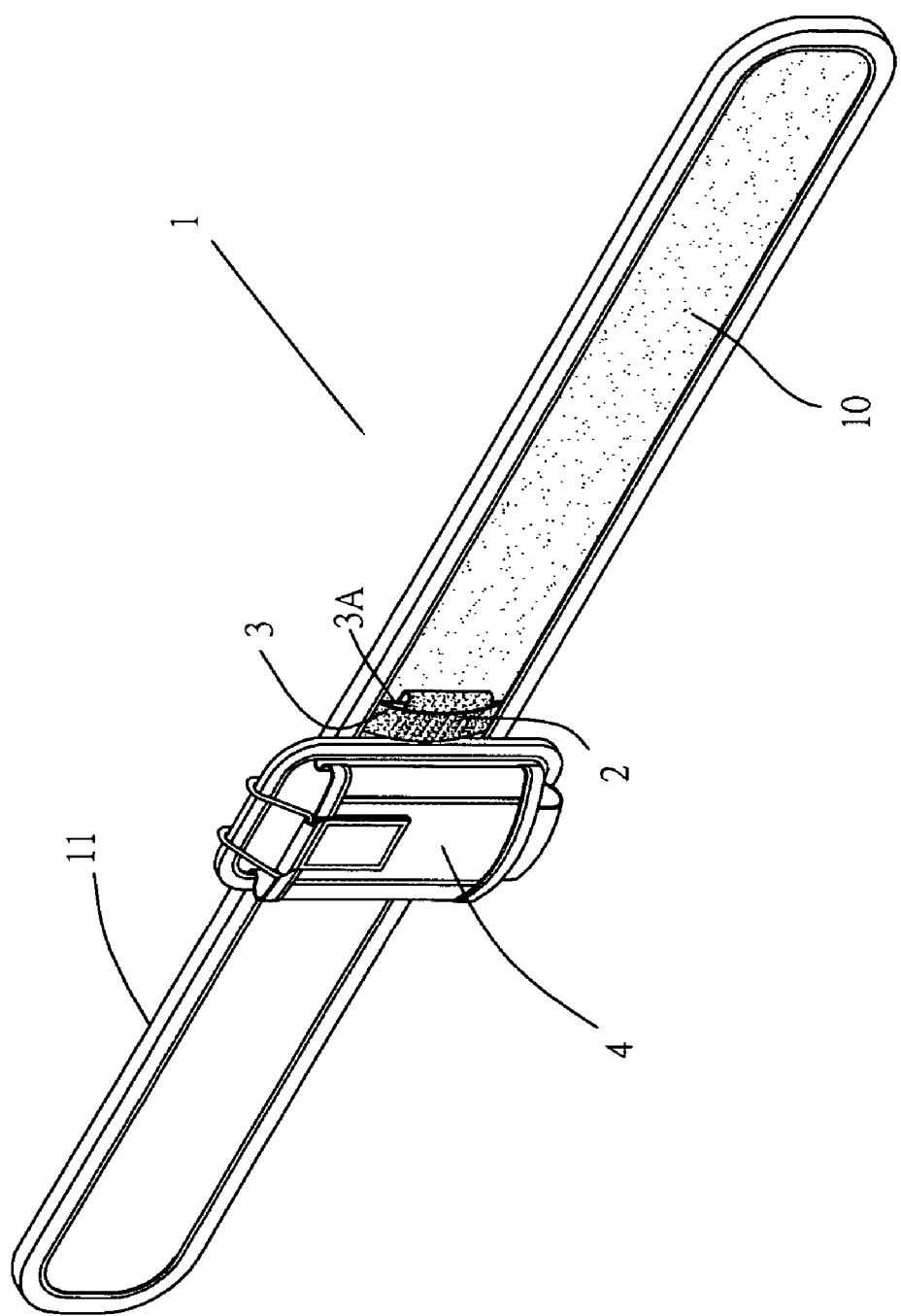
FIG. 3B is another assembled view about the use in FIG. 3A.

The uses of the present invention will be described herein. Referring to FIGS. 3A and 3B. For example, as an MP3 is desired to be carried with the body, the short extending retaining strap 2 can pass through a combining hole of an MP3 protecting cover 4 (at the backside). Then the short extending retaining strap 2 is folded to pass through the gap between the inner folded strap 3A and the outer folded strap 3. The free end of the short extending retaining strap 2 is then fixed to the attachable tape of the strap surface 10.

Figure 4:
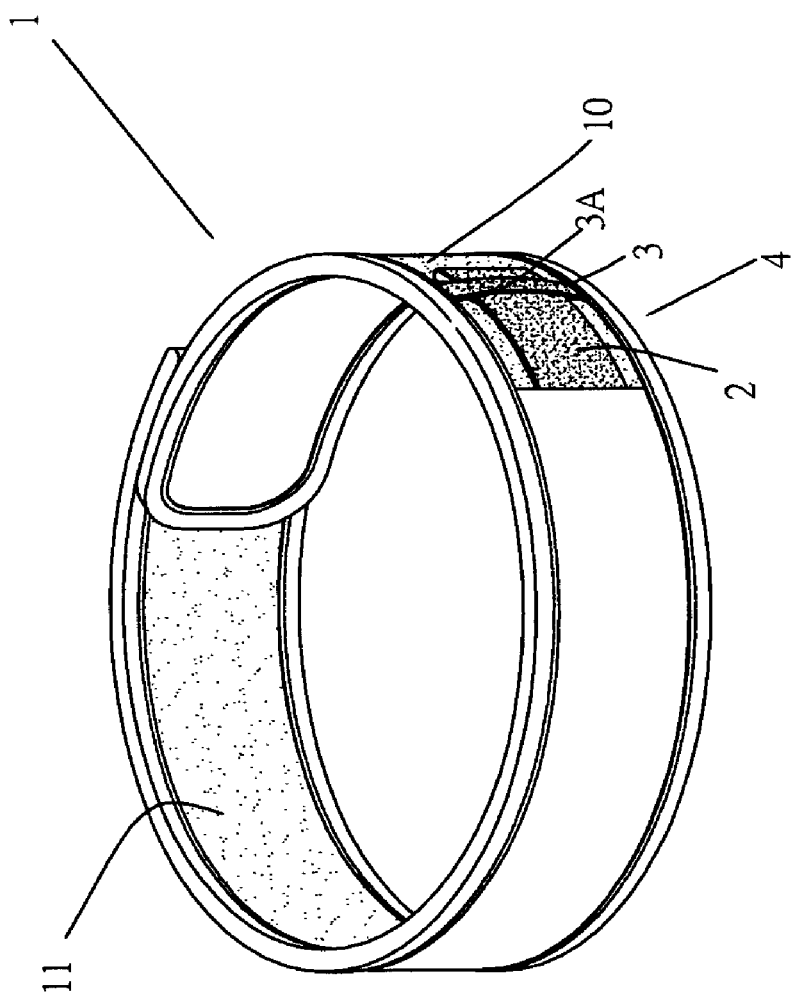
FIG. 4 shows one application of the present invention, where the present invention is wound as a ring.
Figure 5:
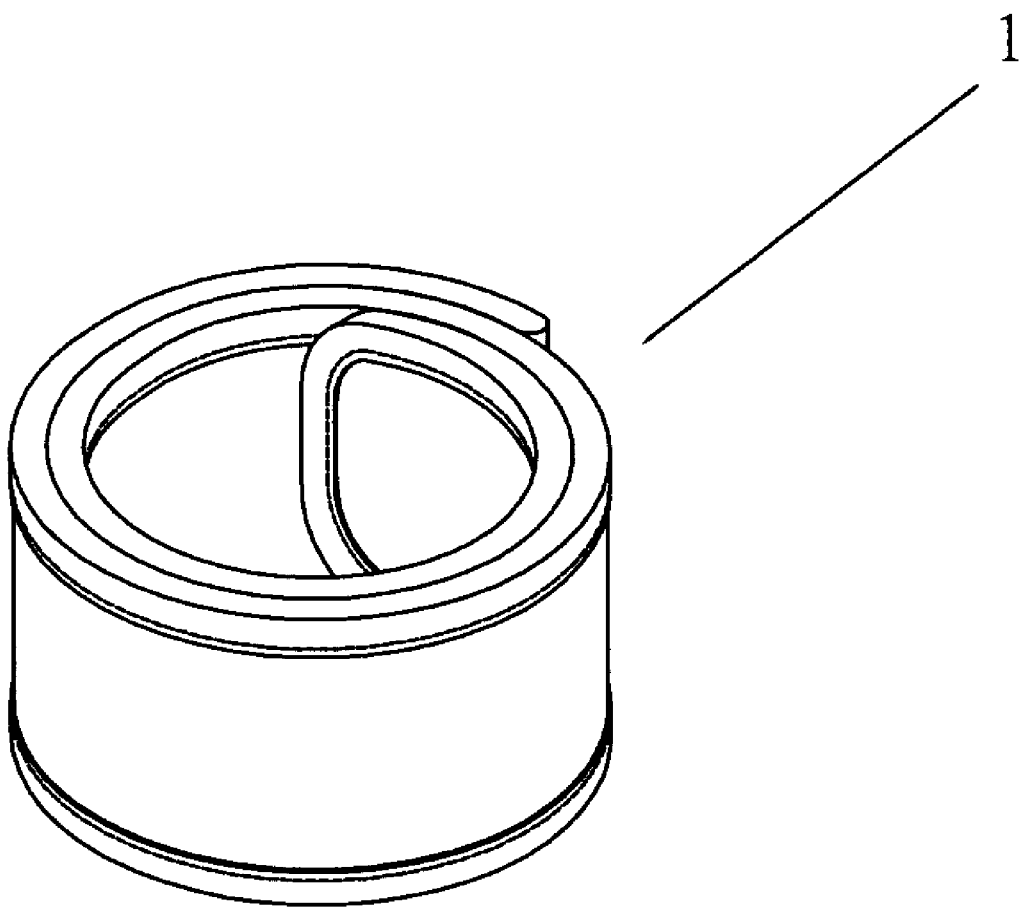
FIG. 5 shows another application of the present invention, where the present invention is wound with a smaller ring.

Referring to FIG. 5, the present invention can be wounded to has a compact size. FIG. 4 shows that the present invention is wound as a larger ring.

Figure 6:
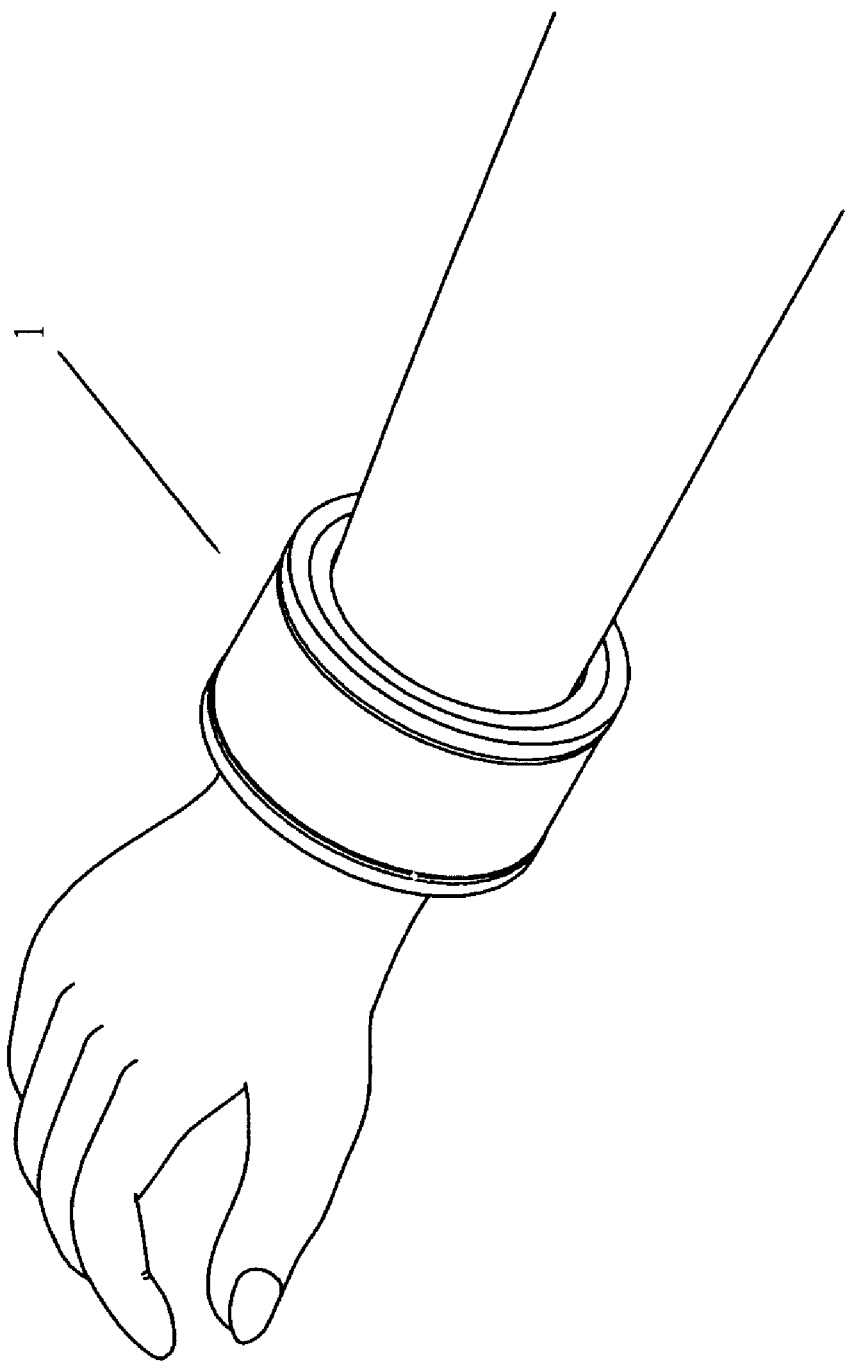
FIG. 6 shows that the present invention is used as a wrist protecting ring.

Referring to FIG. 6, it shows that the ring of the present invention can be retained around the wrist.

Figure 7:
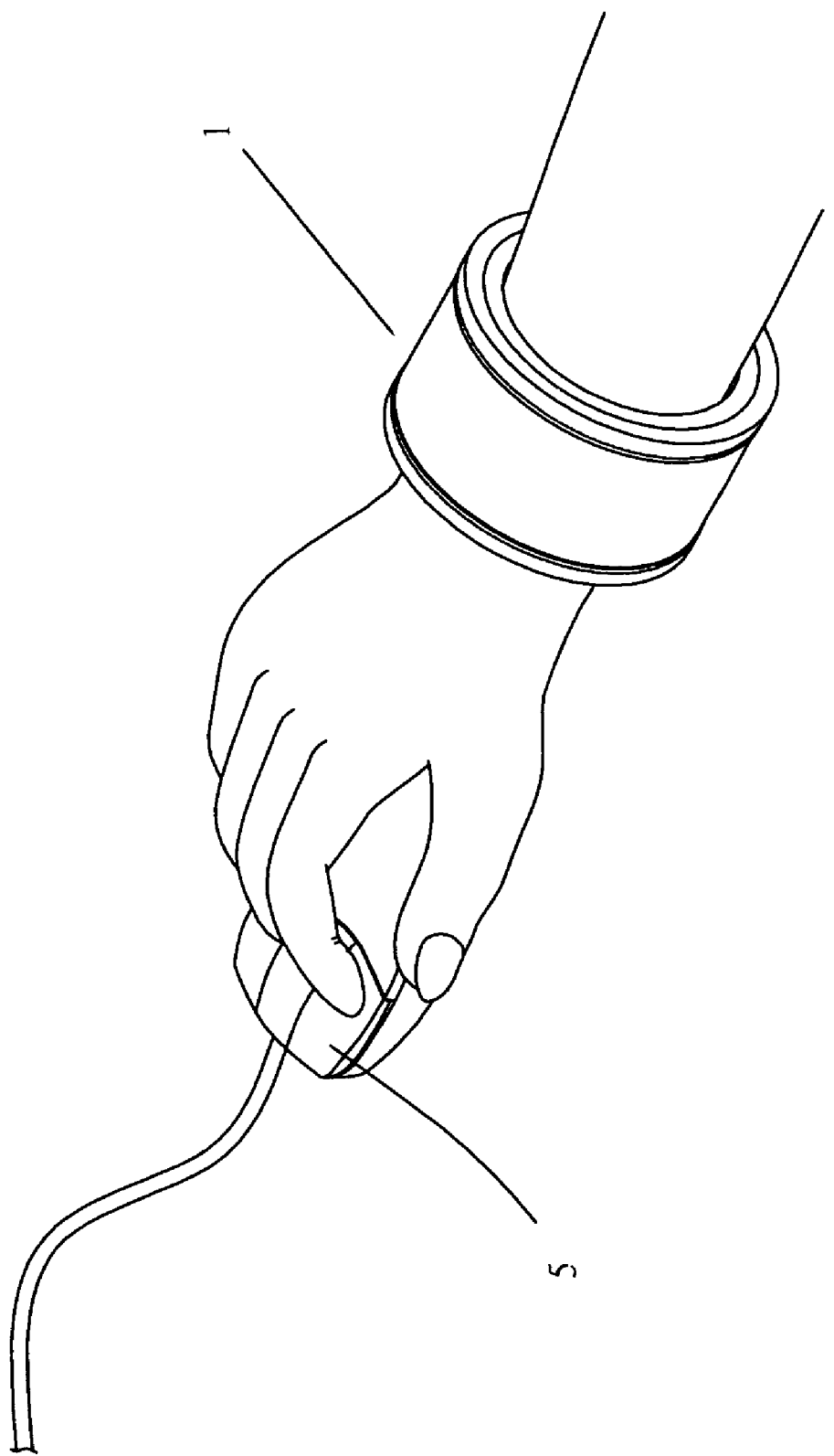
FIG. 7 shows that the present invention is used as a wrist protecting ring as operating with a computer mouse.
Figure 7A:
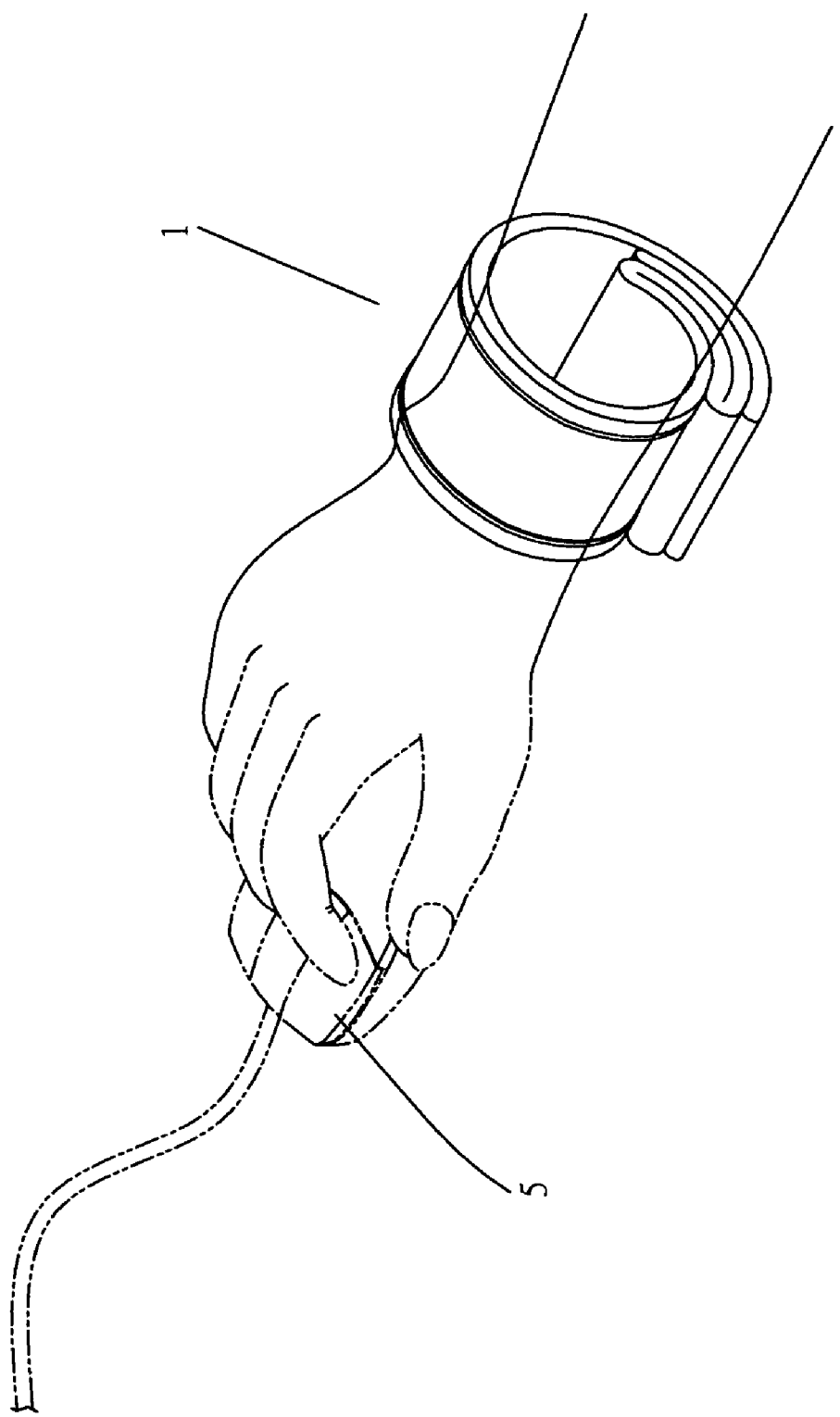
FIG. 7A shows a schematic view about the use in FIG. 7.

Referring to FIG. 7, it shows that the multi-functional retaining strap 1 of the present invention can be wound to have a desired thickness so that the present invention is wound around the wrist as a protecting pad and as a supporter when the user operates a computer mouse 5. Referring to FIG. 7A, another application of the present invention is illustrated. The multi-functional retaining strap 1 can be folded along an Z path so as to have a greater thickness.

Figure 8:
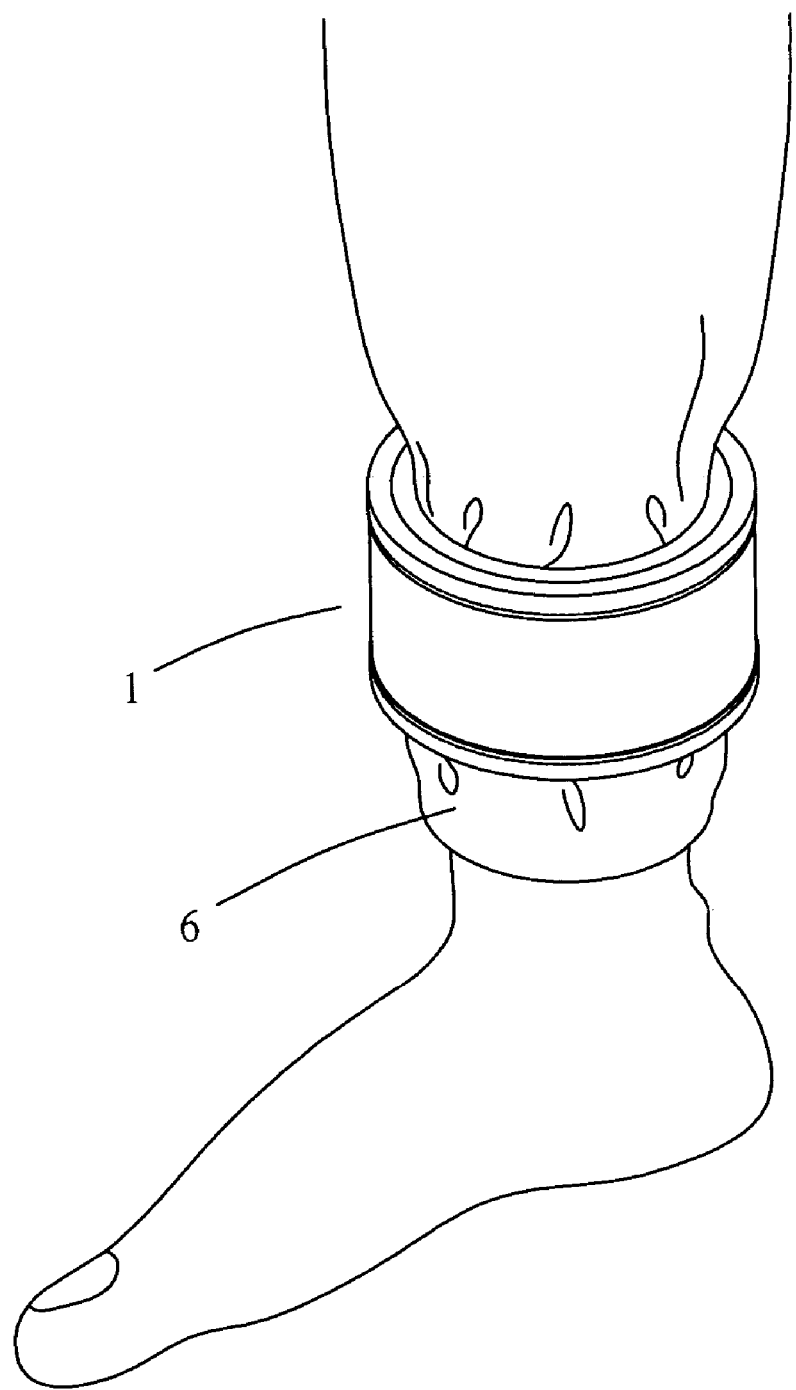
FIG. 8 is a schematic view showing that the present invention is used as a protecting ring of a trouser tube.

Referring to FIG. 8, the present invention can be used to confine a trouser tube so as to avoid the trouser to be caught by a gear in driving a bicycle or an automobile.

Figure 9:
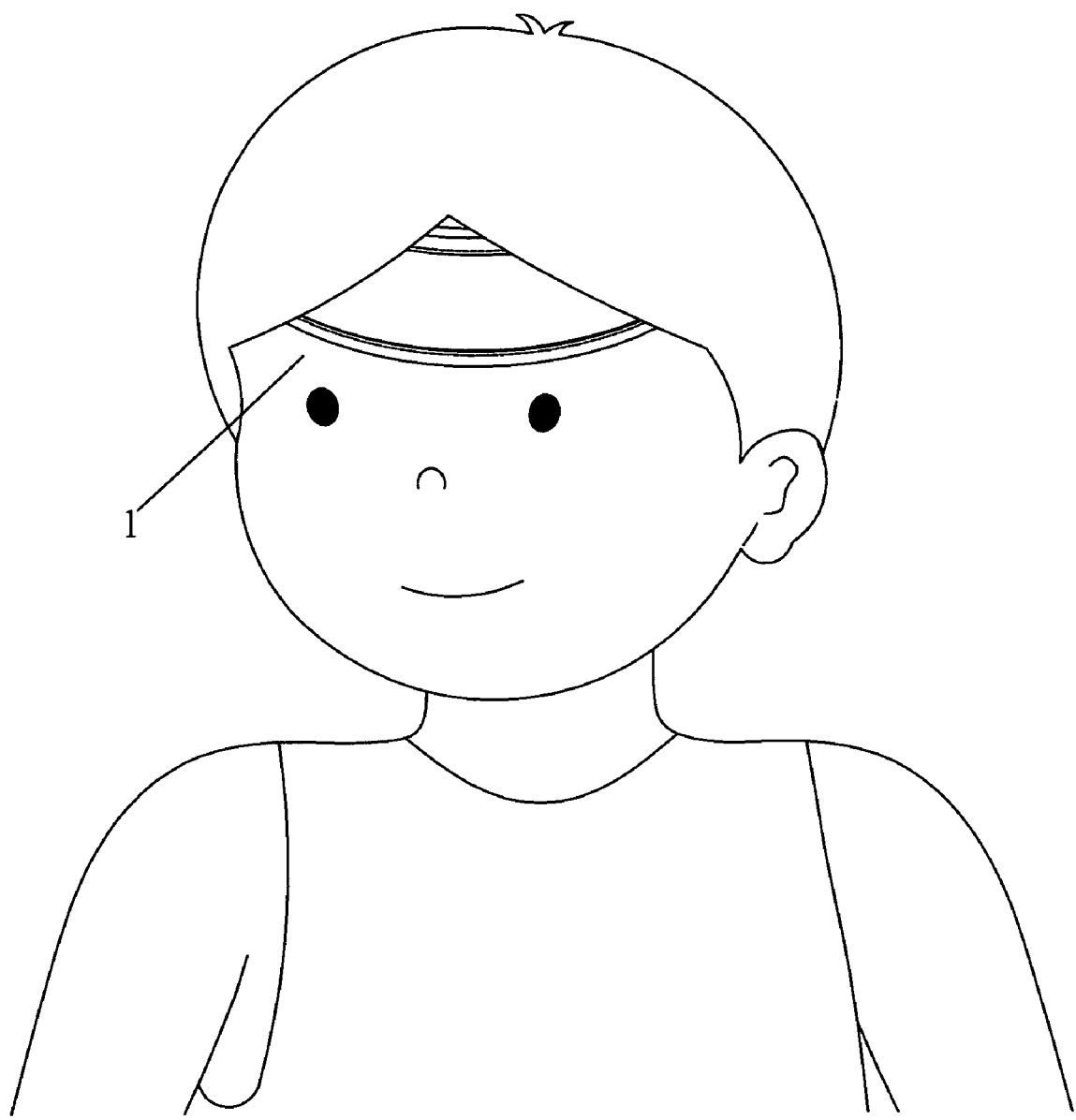
FIG. 9 is a schematic view showing that the present invention is used as a ring which encloses the forehead of a user.

Referring to FIG. 9, two multi-functional retaining straps 1 can be combined and then retained on the forehead of the head.

Figure 10:
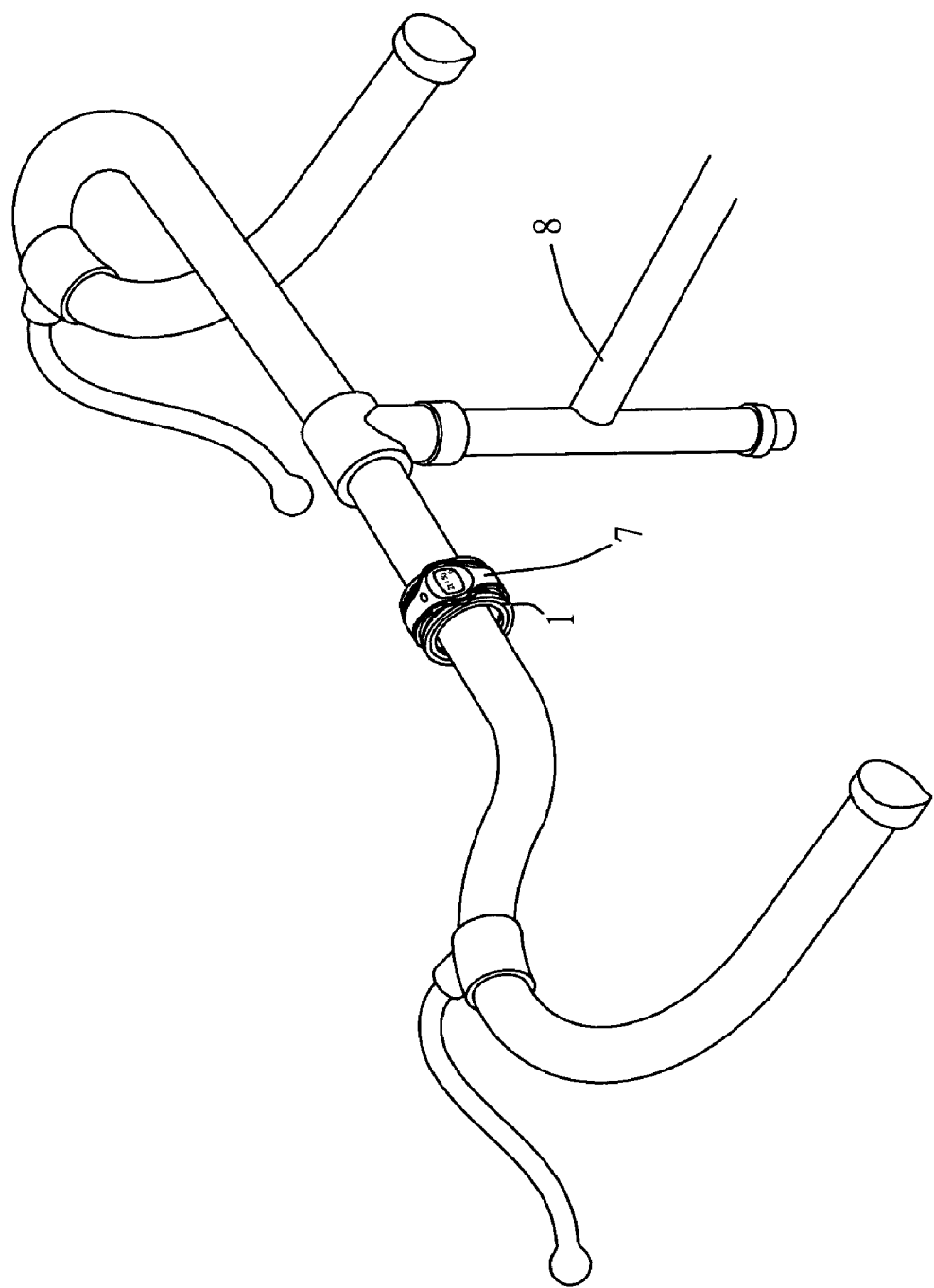
FIG. 10 is a schematic view showing that the present invention is fixed to a handle of a bicycle for fixing an electronic watch.
Figure 11:
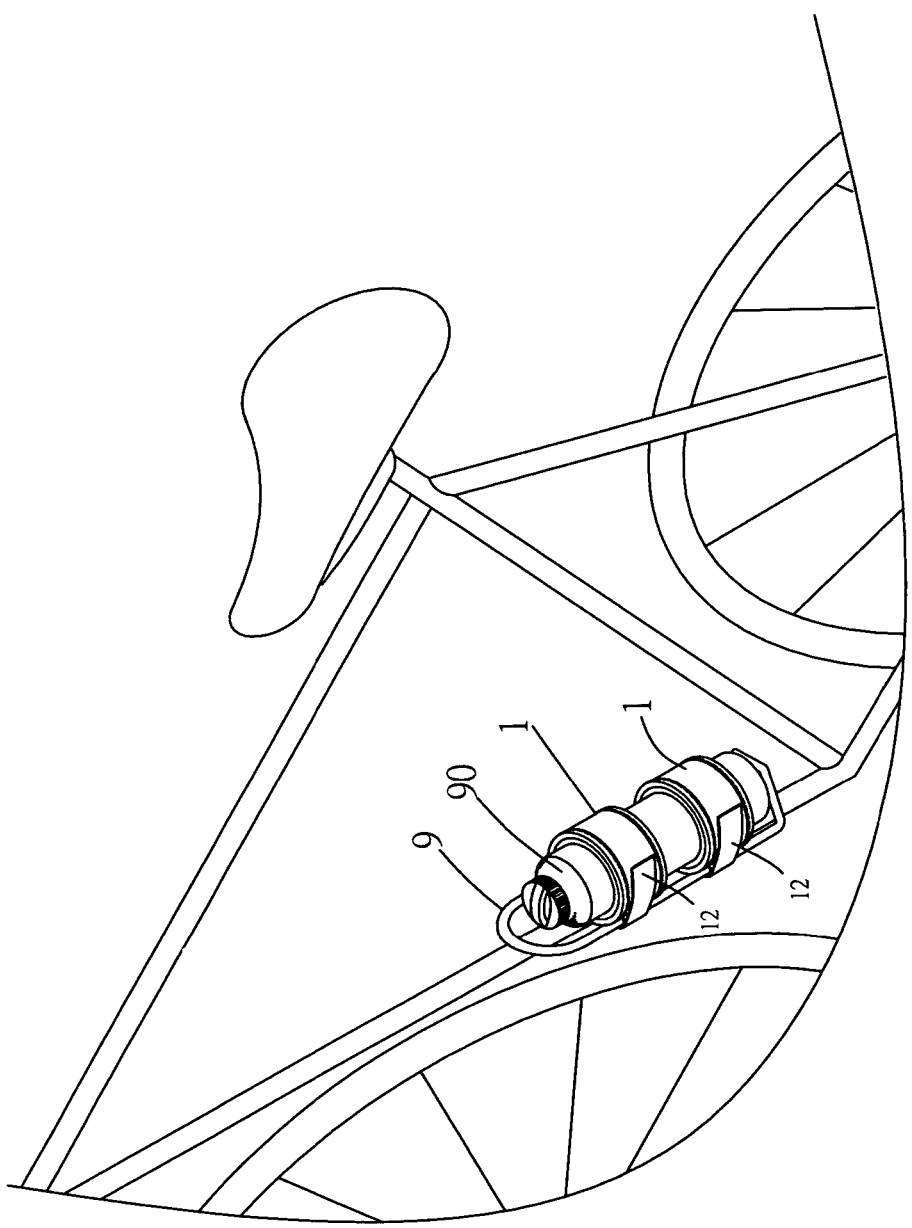
FIG. 11 is a schematic view showing that the present invention is retained with a kettle frame for fixing a container.

Besides, the multi-functional retaining strap 1 can be wound around the handle of a bicycle 8 and then an electronic watch 7 is fixed to the multi-functional retaining strap 1 as a timer. Thereby the user can see the indications on the panel of the electronic watch 7 as desired, as shown in FIG. 10, Referring to FIG. 11, in one another of the present invention, the multi-functional retaining strap 1 can pass through a kettle frame 9 as illustrated in the drawing. By adjusting the ring size of the multi-functional retaining strap 1, the multi-functional retaining strap 1 can be used to fix containers of different sizes.

Figure 12:
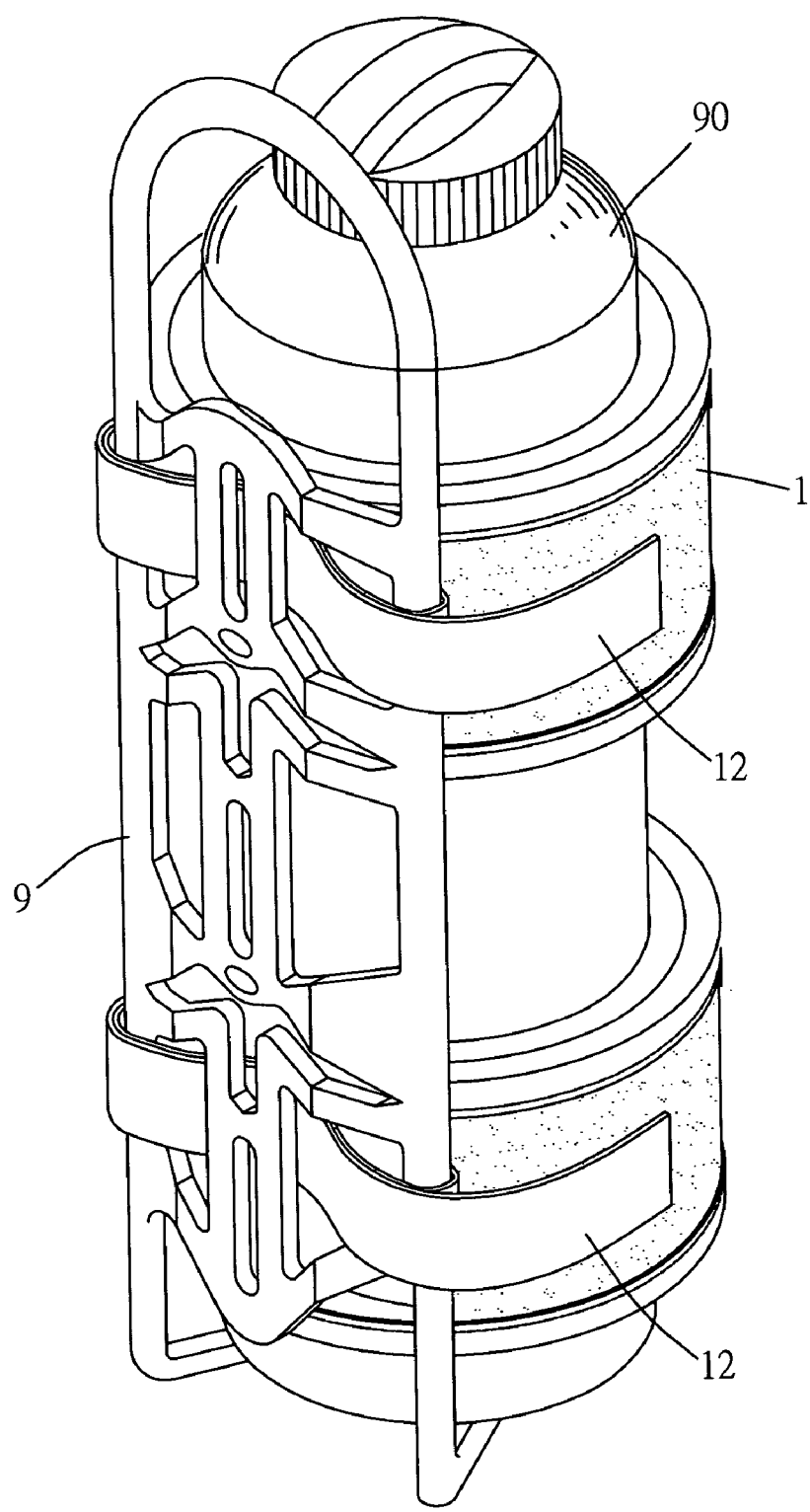
FIG. 12 is a schematic view showing that an auxiliary strap is used to fix to a kettle frame of a bicycle.

Referring to FIG. 12, in the present invention, an auxiliary strap 12 is provided. One surface of the auxiliary strap 12 is formed with an attachable tape. One end of the auxiliary strap 12 can be fixed to the short extending retaining strap 2 so as to prolong the length of the short extending retaining strap 2. In use, the combination structure of the short extending retaining strap 2 and the auxiliary strap 12 can pass through the kettle frame 9. Then another end of the auxiliary strap 12 is fixed to the strap surface 10 of the multi-functional retaining strap 1. Thereby the container on the kettle frame 9 is firmly secured to the kettle frame 9 without vibrations.

It should be noted that in the present invention, the attachable tapes is such as loop tapes or hook tapes, or fasteners with loops or fasteners with hooks.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-functional retaining strap; the multi-functional retaining strap having two strap surfaces; each strap surface being installed with attachable tapes; the multi-functional retaining strap comprising:

a short extending retaining strap having one end fixed to a middle section of one of the strap surfaces of the multi-functional retaining strap and another end of the short extending retaining strap being not fixed; a surface of the short extending retaining strap being an attachable tape;

an inner strap attached to one of the strap surfaces retaining the short extending retaining strap; at least one surface of the inner strap being an attachable tape; and an outer strap having two ends fixed to the inner strap; a gap being formed between the inner strap and the outer strap; at least one surface of the outer strap is an attachable tape.

2. The multi-functional retaining strap as claimed in claim 1, further comprising:

an auxiliary strap; one surface of the auxiliary strap being formed with an attachable tape; one end of the auxiliary strap is capable of being fixed to the short extending retaining strap so as to prolong the length of the short extending retaining strap.

3. The multi-functional retaining strap as claimed in claim 1, wherein the attachable tapes are one of loop tapes, hook tapes, fasteners with loops and fasteners with hooks.

\* \* \* \* \*